(12) United States Patent
Kitazawa et al.

(10) Patent No.: US 6,285,515 B1
(45) Date of Patent: Sep. 4, 2001

(54) LENS

(75) Inventors: Tatsuo Kitazawa, Hachioji; Tamotsu Koiwai, Akiruno, both of (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/315,639

(22) Filed: May 20, 1999

(30) Foreign Application Priority Data

May 21, 1998 (JP) .................................................. 10-140208

(51) Int. Cl.⁷ .............................. G02B 17/00; G02B 3/00
(52) U.S. Cl. ........................................... 359/726; 359/642
(58) Field of Search .................................. 359/642, 726, 359/601, 602, 603, 604, 605, 738

(56) References Cited

U.S. PATENT DOCUMENTS

| | | | |
|---|---|---|---|
| 4,989,960 | * 2/1991 | Thomas | 359/738 |
| 5,581,410 | * 12/1996 | Ichikawa et al. | 359/642 |
| 5,870,229 | * 2/1999 | Tsuchida | 359/654 |
| 6,045,577 | * 4/2000 | Woffinden et al. | 623/5 |

FOREIGN PATENT DOCUMENTS

| | | | |
|---|---|---|---|
| 401195435 | * 8/1989 | (JP) | G02B/21/62 |
| 404177301 | * 6/1992 | (JP) | G02B/3/00 |
| 4-177301 | 6/1992 | (JP) . | |
| 411337707 | * 12/1999 | (JP) | G02B/3/00 |

* cited by examiner

Primary Examiner—Georgia Epps
Assistant Examiner—Saeed Seyrafi
(74) Attorney, Agent, or Firm—Ostrolenk, Faber, Gerb & Soffen, LLP

(57) ABSTRACT

A lens is formed in a generally rectangular shape, and a reflection-preventing portion capable of preventing reflection of harmful rays is provided on at least one edge plane forming at least a portion of the perimeter of the lens, so that the lens is capable of suppressing deterioration of the quality of images including object images formed by a photographic lens system, in order to obtain better photographic images.

19 Claims, 13 Drawing Sheets

LENS

BACKGROUND OF THE INVENTION

1. Field of the Invention

The present invention relates to a lens, and particularly relates to lenses making up a photographic lens system used for photography and the like, having reflection preventing means for preventing harmful rays.

2. Description of the Related Art

Photographic lens systems which are used for photography with a photography apparatus such as a camera for forming an image of an object are generally comprised of a plurality of lenses and the like. The front surface of each of such lenses making up the photographic lens system is generally round.

In the event that a portion of incident light rays to such a photographic lens system reflects off of the edge of the lens, i.e., the inner surface of the perimeter rim, the reflected rays may be cast into the range of the photographic aperture. In the case that such reflected light reaches the formed image, this can cause blurring or ghosting, for example, which consequently has a negative effect on the object image and deteriorates the image quality of the photographed image.

In order to suppress harmful rays which cause blurring and ghosting, known arrangement involve measures such as coating the edge plane of the lens with a black color or the like, providing a groove or the like in a direction orthogonal to the optical axis of the edge plane, and so forth, thereby suppressing generation of harmful rays.

On the other hand, the shape of the aperture for forming a photographic image is generally rectangular, with photography apparatuses such as cameras and the like. In accordance with this, various photographic lens systems using a lens formed by cutting away portions unnecessary for image formation, i.e., portions other than the effective area of the lens corresponding with the photographic screen, are proposed in Japanese Unexamined Patent Publication No. 4-177301, for example.

This arrangement aims to reduce the overall size of the lens system without narrowing the effective area of the lens to the photographic screen, by forming the front surface of the lens in a rectangular shape so as to correspond with the photographic screen (photographic aperture).

However, in the event that a part of the perimeter of the lens is cut away, as represented by the means disclosed in the above Japanese Unexamined Patent Publication No. 4-177301, the edge of the perimeter (i.e., the cut plane) of the lens is closer to the optical axis of the lens as compared to the lens before cutting.

This effect translates into an increase in the ratio of incident light rays to the lens system reflecting off of the edge of the perimeter of the lens and cast into the range of the photographic aperture so as to reach the formed image as harmful rays. This is problematic, since it has markedly adverse effects on and deteriorates the photographic image.

This will be described in further detail, with reference to FIG. 33 and FIG. 34 of the drawings attached to the present Application.

FIG. 33 is a lens configuration diagram illustrating the main cross section of a common photographic lens system comprised of multiple lenses. The optical path of a portion of the incident rays of the object light flux cast into this photographic lens system is shown.

FIG. 34 is a lens configuration diagram illustrating the main cross section of a photographic lens system wherein a portion of the perimeter of a part of the lenses in the photographic lens system shown in FIG. 33 has been cut away and re-configured. The incident rays cast into this photographic lens system, and the optical path of the harmful rays caused thereby are shown. In this FIG. 34, the portion indicated by the dotted lines (reference numeral 105) represents the portion of lens that has been cut away.

In a normal photographic lens system, light flux from the object or the like cast into the photographic lens system 101 as shown in FIG. 33, upon passing through the shutter/diaphragm mechanism 104 and the like without obstruction, follows a path such as shown by reference numeral 102 to reach a point X 101 on the same plane as the photographic aperture 103.

The point X 101 shown here is a position out of the range of the photographic aperture 103. Accordingly, in the event that incident rays are cast into the photographic lens system 101 such as that shown by reference numeral 102, there is no effect on the image including the object image (photographic results) obtained upon being imaged behind the photographic aperture 103.

Next, let us consider the case of the means disclosed in Japanese Unexamined Patent Publication No. 4-177301 and so forth, i.e., a configuration wherein a portion (shown by reference numeral 105 in FIG. 34) of the perimeter of a part of the lenses in the photographic lens system shown in FIG. 33 has been cut away.

In this case, the light flux from the object or the like cast into the photographic lens system 101A as shown in FIG. 34, upon passing through the shutter/diaphragm mechanism 104 and the like without obstruction, reflects off the edge plane 101Ab of the perimeter of the lens 101Aa at which part of the perimeter has been cut off, i.e., reflects off of the cut plane, and follows a path such as shown by reference numeral 102A to reach a point X 102 which is in the range of the photographic aperture 103.

The point X 102 shown here is a position in the range of the photographic aperture 103. Accordingly, the incident rays 102A become harmful rays which have adverse effects on the image including the object image obtained upon being imaged by the photographic lens system In this way, in the event that a part of the perimeter of the lens is cut away, the edge (i.e., the cut plane) of the lens is closer to the optical axis of the lens, so more harmful rays (reflected rays, etc.) are propagated. Accordingly, using such a photographic lens system for photography deteriorates the photographic image obtained as a result of the photography.

However, the above Japanese Unexamined Patent Publication No. 4-177301 discloses no means for suppressing such harmful rays. Accordingly, the means as disclosed caused problem of deterioration of the photographic image due to the above-described harmful rays.

SUMMARY OF THE INVENTION

Accordingly, it is an object of the present invention to provide a lens whereby the image quality of an image including an object image formed by a photographic lens system can be prevented from deteriorating, thereby obtaining even better photographic results (images).

Briefly, according to the first aspect of the present invention, a lens is formed in a generally rectangular shape, wherein a reflection-preventing portion capable of preventing reflection of harmful rays is provided on at least the plane neighboring the optical axis of the edge planes.

Also, according to a second aspect of the present invention, at least one lens of the lenses comprising a photographic optical system is arranged such that the perimeter of the lens has been removed except for the effective area of the lens corresponding with a photographic screen formed by a photographic aperture, and wherein a harmful ray suppressing portion capable of preventing reflection of rays from the edge of the lens at this removed portion is provided along this edge portion.

These and further objects and advantages of the present invention will become clearer from the following detailed description.

According to the present invention, providing a rectangularly formed lens and forming reflection preventing means or harmful ray-suppressing means capable of preventing reflection of incident light and suppressing the generation of harmful rays to the rectangularly formed lens, and using this lens in a photographic lens system, prevents deterioration of the image including the object image formed by this lens system, thereby providing a lens whereby photography results (images) can be obtained.

DETAILED DESCRIPTION OF THE PREFERRED EMBODIMENTS

The following embodiments are examples of applying the lens according to the present invention to a photographic lens used by a camera for photography.

Figure 1:
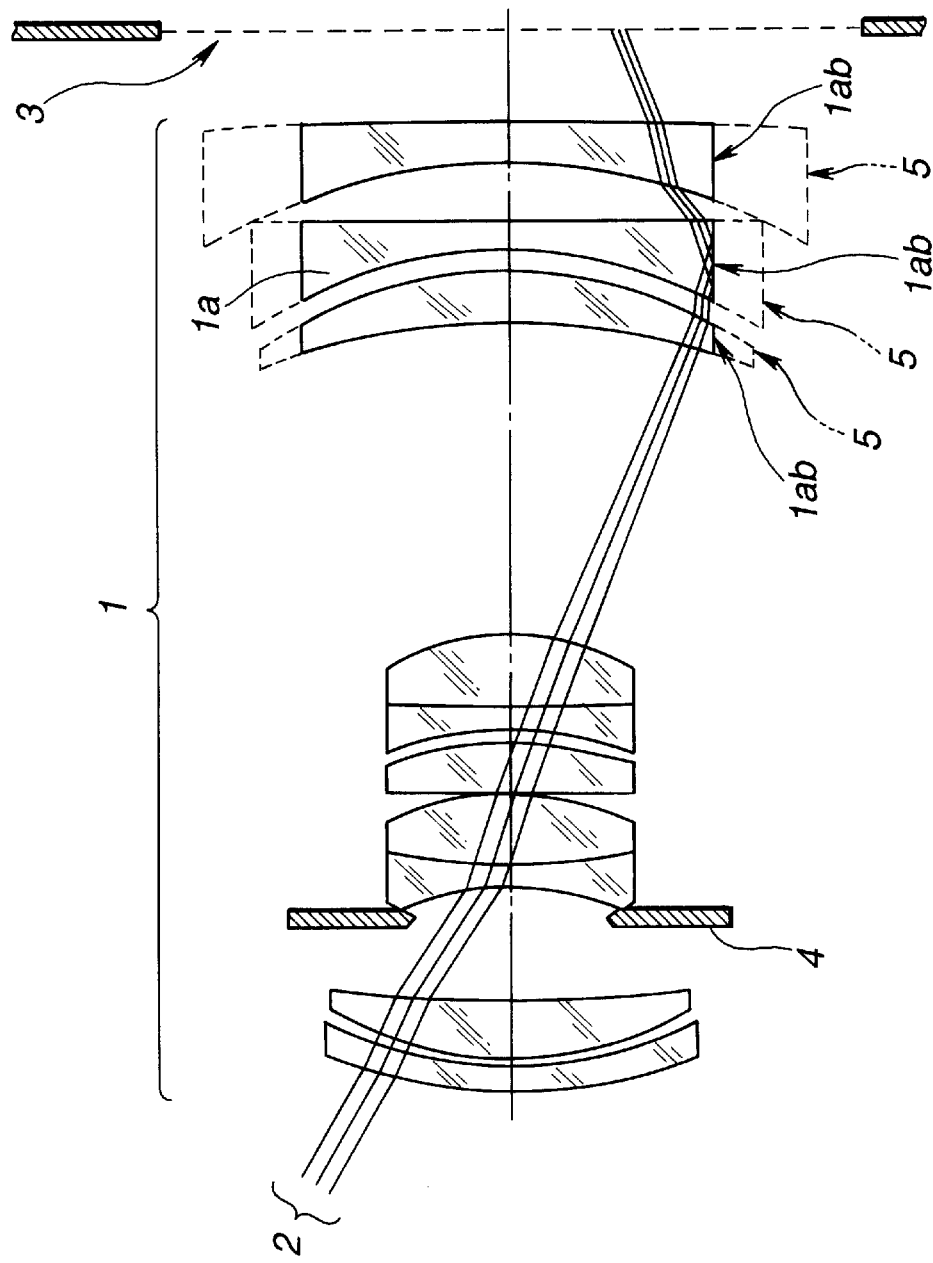
FIG. 1 is a lens configuration diagram illustrating the main cross-section of a photographic lens system according to a first embodiment of the present invention.

As shown in FIG. 1, the photographic optical system (hereinafter referred to as "photographic lens system") 1 according to the present embodiment is configured as a plurality of lenses, and a shutter/diaphragm mechanism 4 is provided at a certain position. Incidentally, the photographic lens system according to the present embodiment is a zoom lens with variable magnification, and FIG. 1 shows the focal distance of the zoom lens at an arbitrary distance.

Figure 33:
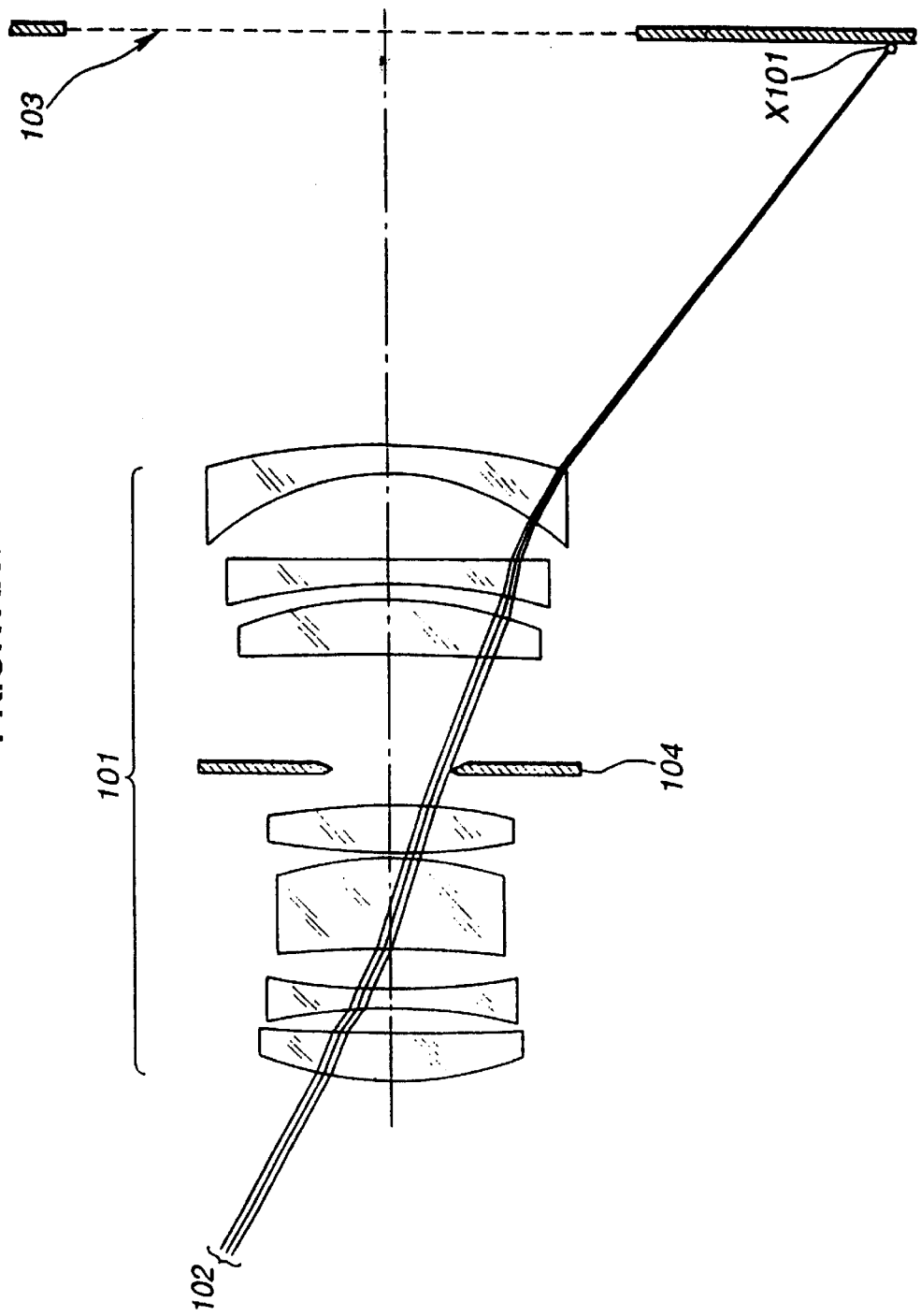
FIG. 33 is a lens configuration diagram illustrating the main cross-section of a known photographic lens system comprised of multiple lenses, showing the optical path of a portion of the incident rays of the object light flux cast into this photographic lens system.
Figure 34:
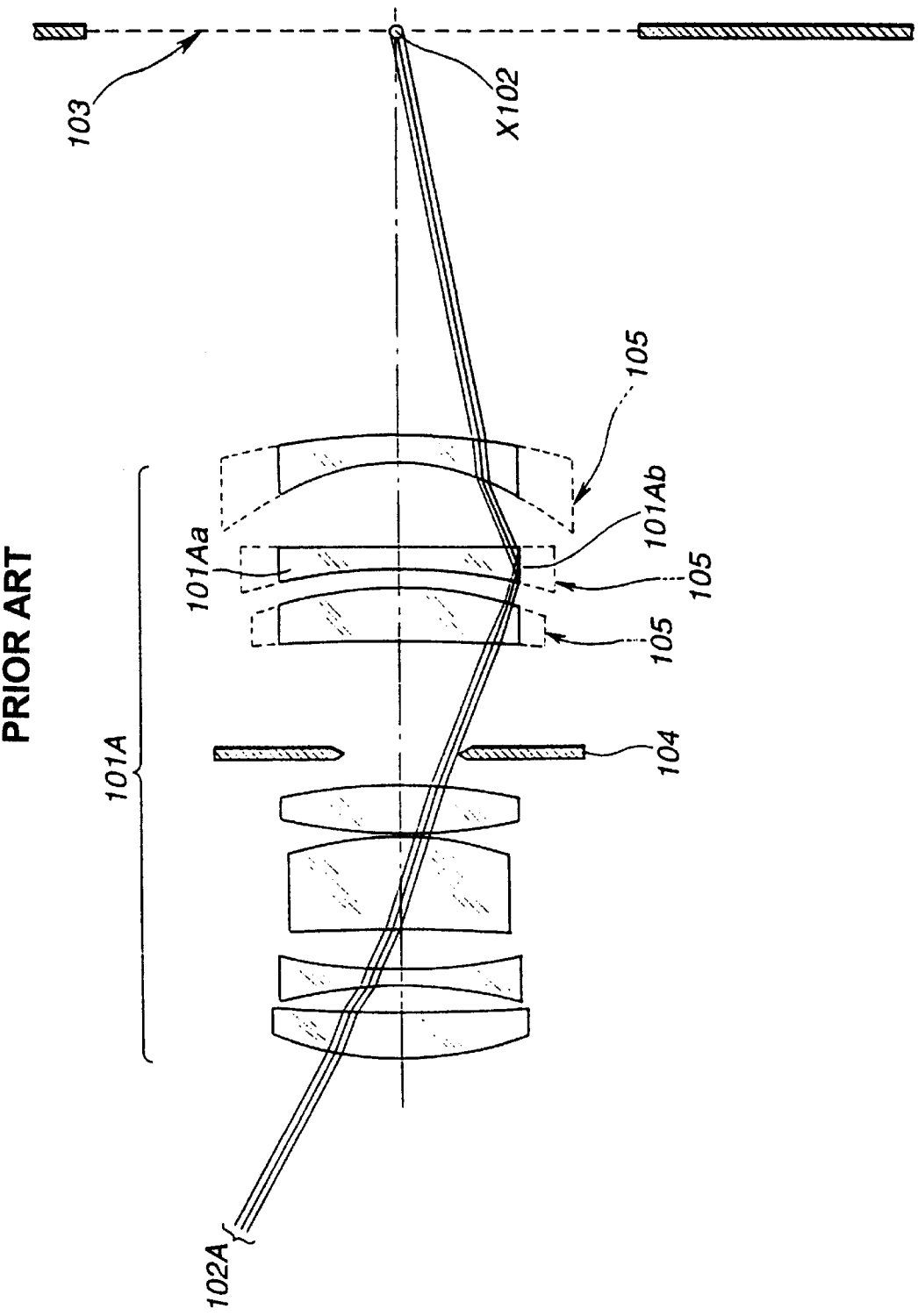
FIG. 34 is a lens configuration diagram illustrating the main cross-section of a photographic lens system wherein a portion of the perimeter of a part of the lenses in the known photographic lens system shown in FIG. 33 has been cut away and re-configured, showing the incident rays cast into this photographic lens system, and the optical path of the harmful rays which can be caused thereby.

Now, regarding the photographic lens system for compact cameras and the like, there are arrangements wherein the lens system is configured as a telephoto-type lens system, in order to shorten the overall length of the lens system. With such photographic lens systems, the lenses in the rear group are generally of greater diameter than the lenses in the front group (see reference numeral 5 shown by dotted lines in FIG. 1, or FIG. 33).

Accordingly, the size of this rear group increases the overall size of the photographic lens system, and this has been a factor impeding the reduction in size of photography apparatuses such as camera using the photographic lens system.

Hence, with the photographic lens system 1 according to the present embodiment, of the plurality of lenses forming the photographic lens system 1 as shown in FIG. 1, the three lenses at the rear group have a portion of the perimeter thereof cut away, so that the cross-section thereof in the direction orthogonal to the optical axis is of a generally rectangular form. The portion that is cut away, i.e., the portion indicated by dotted lines in FIG. 1 (reference numeral 5) is the portion of each of the lenses other than the portion equivalent to the effective area of the respective lens corresponding to the image screen formed by the photographic aperture 3.

Such an arrangement realizes a reduction in size of the photographic lens system 1 without narrowing the effective area of the lens with respect to the photographic screen.

The object light flux cast into the photographic lens system 1 thus configured may become harmful rays upon following an optical path such as that indicated by reference numeral 2 in FIG. 1. That is, the incident rays 2 are cast into the front lenses of the photographic lens system 1, and upon passing through the shutter/diaphragm mechanism without being obstructed, reach the edge of the perimeter] of the lens 1a, i.e., the cut plane 1ab.

Figure 3:
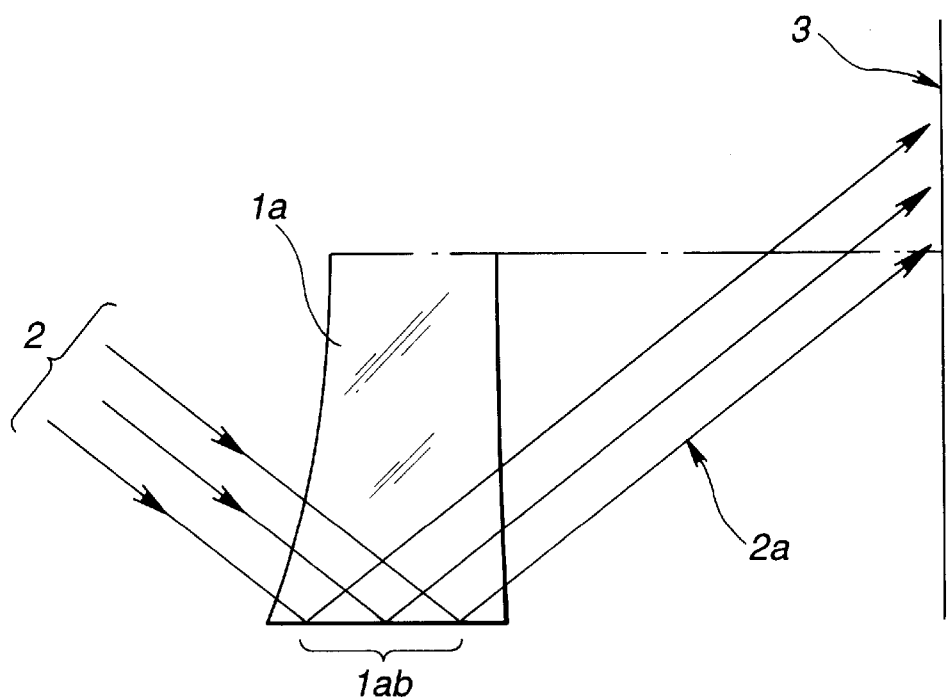
FIG. 3 is an enlarged main cross-sectional view of a principal portion showing only the lower half of the lens shown in FIG. 2.

Now, in the event that the incident rays reflect off of the cut plane 1ab as shown in the enlarged diagram FIG. 3, the reflected rays 2a become harmful rays which are cast into the range of the photographic aperture 3. To prevent this effect, means for suppressing these harmful rays are provided in the lens 1a of the photographic lens system 1 according to the present embodiment, to serve as reflection-preventing means and harmful ray-suppressing means for restricting reflection at the cut plane 1ab.

The reflection-preventing means/harmful ray-suppressing means will now be described.

Figure 2:
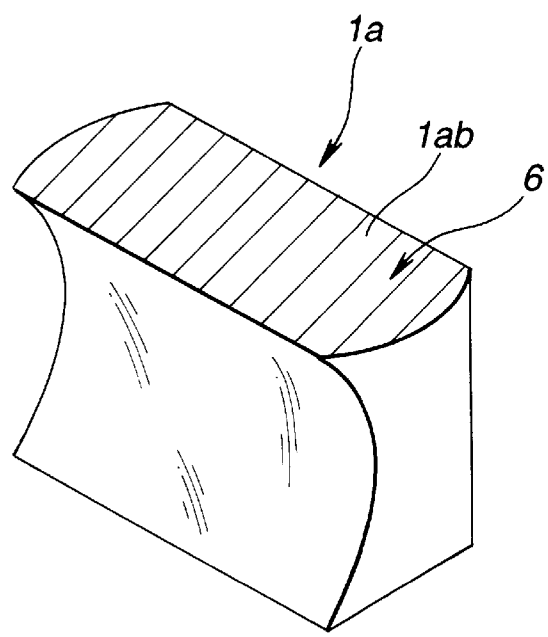
FIG. 2 is a schematic perspective diagram of a portion of the photographic lens system shown in FIG. 1.

As shown in FIG. 2, a black non-transmitting coat 6 is provided on the cut plane 1ab of the lens 1a, which is one of the lenses from which the perimeter has been cut away as shown in FIG. 1, to serve as the reflection-preventing means/harmful ray-suppressing means. This black non-transmitting coat 6 serves to absorb harmful rays cast on the cut plane 1ab of the lens 1a.

Figure 4:
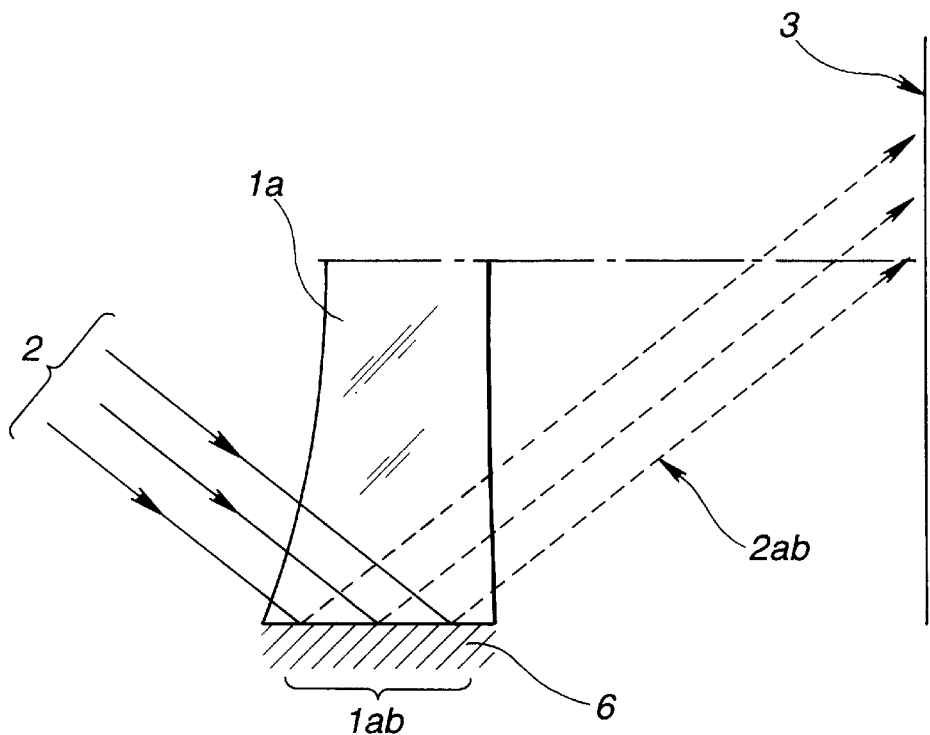
FIG. 4 is an enlarged main cross-sectional view of a principal portion showing only the lower half of a lens extracted from the photographic lens system shown in FIG. 1, this lens having the perimeter thereof cut off.

In FIGS. 3 and 4, the reflected rays 2a and 2ab are distinguished by being represented by solid lines and dotted lines, respectively. In other words, the reflected rays 2ab indicated by dotted lines in FIG. 4 have been reduced by the black non-transmitting coat 6 as compared with the reflected light 2a shown in FIG. 3. FIGS. 3 and 4 thus demonstrate one mechanism by which generation of harmful rays which reach the range of the photographic aperture 3 can be suppressed.

According to the first embodiment of the present invention, a black non-transmitting coat 6 is provided as a reflection-preventing means/harmful ray-suppressing means on the cut plane 1ab along the edge forming the perimeter of a lens in the photographic lens system 1, to thereby suppress the generation of harmful rays. Accordingly, deterioration of image quality of the photographic image including the object image which is formed by the photographic lens system 1 can be prevented, thereby obtained even better photographic results (images).

Incidentally, this description has been made regarding only the lens 1a of the photographic lens system 1, but the cut planes 1ab of the other lenses at which the edges forming the perimeter has been cut away as described above have been subjected to the same reflection-preventing means/harmful ray-suppressing means, thereby forming reflection-preventing portions.

Also, in order to simplify the FIGS. 3 and 4, refraction of rays at the border between the planes of the lens 1a and the air have been omitted in the illustration of incident rays 2 entering the lens 1a and harmful rays 2a and 2ab exiting the lens 1a. This simplification is applicable to the descriptions regarding the other embodiments as well.

Figure 5:
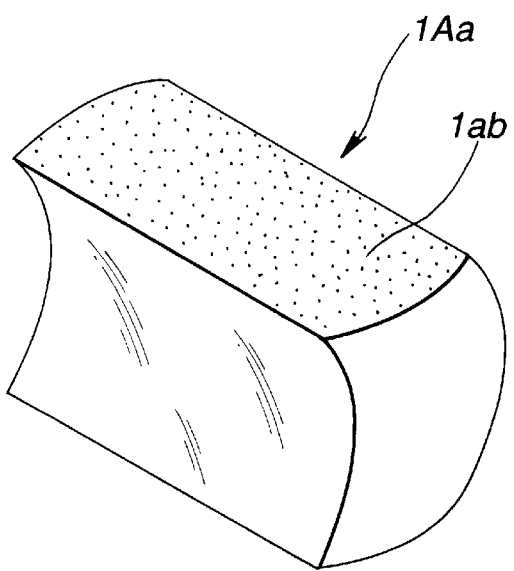
FIG. 5 is a schematic perspective diagram of a lens according to a second embodiment of the present invention.
Figure 6:
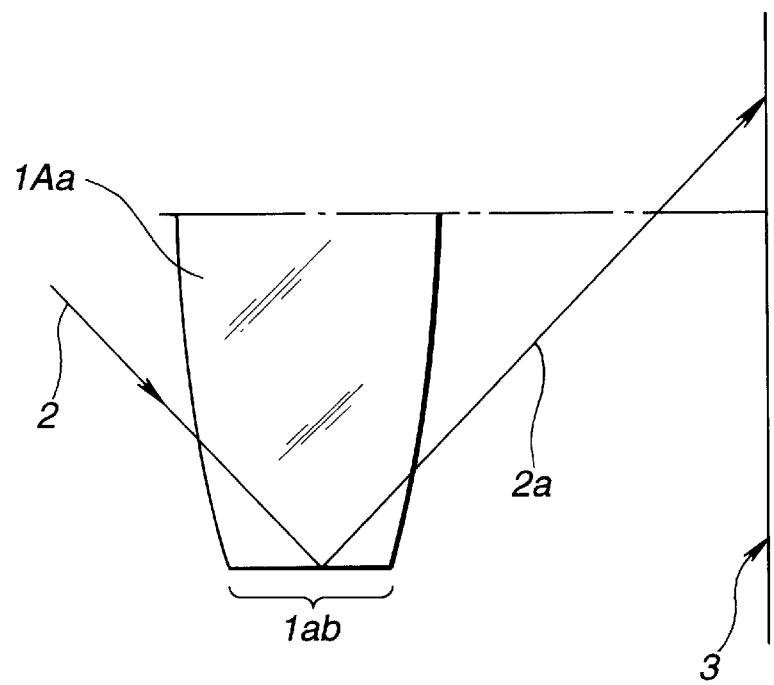
FIG. 6 is an enlarged main cross-sectional view of a principal portion showing only the lower half of the lens shown in FIG. 5, illustrating the optical path of harmful rays occurring in this lens.
Figure 7:
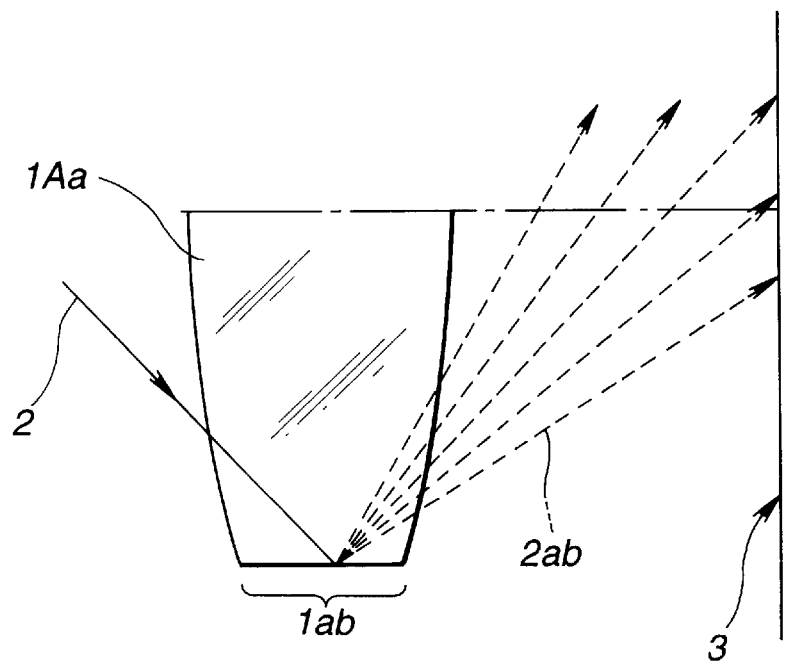
FIG. 7 is an enlarged main cross-sectional view of a principal portion showing only the lower half of the lens shown in FIG. 5, illustrating the incident rays cast into this lens, and the optical path of harmful rays which can be prevented by reflection preventing means provided in this lens.

Next, a second embodiment of the present invention will be described with reference to FIGS. 5 through 7. FIG. 5 is a perspective view of a relevant edge region of a lens according to this embodiment. FIG. 6 illustrates the optical path of harmful rays which can occur in this lens, and FIG. 7 illustrates the incident rays cast into this lens and the optical paths of harmful rays which can be prevented by the reflection-preventing means provided in this lens.

The overall configuration of the photographic lens system in which the lens of the present embodiment is included is generally the same as that in the first embodiment. Accordingly, the details thereof are omitted from the drawings, which would appear substantially the same as in FIG. 1.

Also, the same reflection-preventing means/harmful ray-suppressing means of the lens according to the present invention may be applied to lenses of various forms, so the lenses described in the present embodiment and the following embodiments are each described as different examples of the various forms.

The lens 1Aa according to the second embodiment has a portion of the perimeter thereof cut away, so that the cross-section thereof in the direction generally orthogonal to the optical axis is of a generally rectangular form. In the event that incident rays cast into this lens 1Aa are reflected at the cut plane 1ab, the reflected rays may be cast into the range of the photographic aperture 3, as shown in FIG. 6. This may result in the reflected rays 2a having adverse effects on the photographic image formed by the photographic aperture 3.

Accordingly, the lens 1Aa of the present embodiment has reflection-preventing means achieved by surface processing to form extremely minute rough formations on the surface of the cut plane 1ab as shown in FIG. 5, i.e., a sand paper-like surface. According to this arrangement, in the event that incident rays are cast into the surface of the cut plane 1ab on which the roughened surfacing has been provided as the reflection-preventing means, the reflected light 2ab is scattered as shown in FIG. 7, so the reflected light 2ab does not converge at the same point on the plane of the photographic aperture 3.

Thus, according to the present embodiment, the rays reflected by the lens 1A*a* can be scattered by roughening the surface of the cut plane 1*ab,* thereby reducing the effects of harmful rays. Accordingly, advantages similar to the above-described first embodiment can be obtained.

Incidentally, the reflection preventing means shown with reference to the first embodiment (i.e., the black non-transmitting coat 6 on the cut plane 1*ab*), and the reflection preventing means shown with reference to the second embodiment (i.e., the roughened surfacing on the cut plane 1*ab*) may be used in conjunction. Such an arrangement further suppresses harmful rays, and contributes to improvement in the photographed image.

Next, a lens according to a third embodiment of the present invention will be described with reference to FIGS. 8 through 10.

Figure 8:
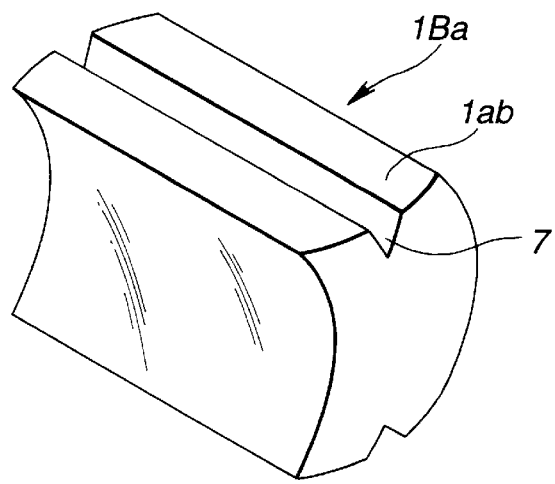
FIG. 8 is a schematic perspective diagram of a lens according to a third embodiment of the present invention.

FIG. 8 illustrates a lens having edge regions according to the third embodiment. FIG. 9 illustrates the optical path of harmful rays which can be prevented by the reflection-preventing means/harmful ray-suppressing means provided in this lens. Also, FIG. 10, which is shown only for reference, is a diagram illustrating the optical path of harmful rays which would otherwise occur if a reflection preventing portion were not provided in a lens of the same form.

The lens 1B*a* according to the third embodiment also has a portion of the perimeter thereof cut away, as with the lenses 1*a* and 1A*a* in the first and second embodiments, so that the cross-section thereof in the direction generally orthogonal to the optical axis is of a generally rectangular form. The cut plane 1*ab* of the lens 1B*a* is provided with a groove 7 having a triangular cross-section in a direction generally orthogonal to the optical axis, as shown in FIG. 8, the groove 7 serving as a reflection-preventing portion.

Now, in the case of a lens Baa in which the groove 7 constituting the reflection-preventing portion is not provided, the incident rays to the lens 1B*aa* reflect off of the cut plane 1*ab*. In this case, in the event that these reflected rays 2*a* reach within the range of the photographic aperture 3, these rays become harmful rays which cause deterioration of the photographic image formed by the photographic aperture 3.

Accordingly, a groove 7 is provided as a reflection-preventing portion in the cut plane 1*ab* at the perimeter of the lens 1B*a* according to the present embodiment (see FIGS. 8 and 9), thereby deflecting any harmful rays which may otherwise have adverse effects on the photographic image.

Figure 9:
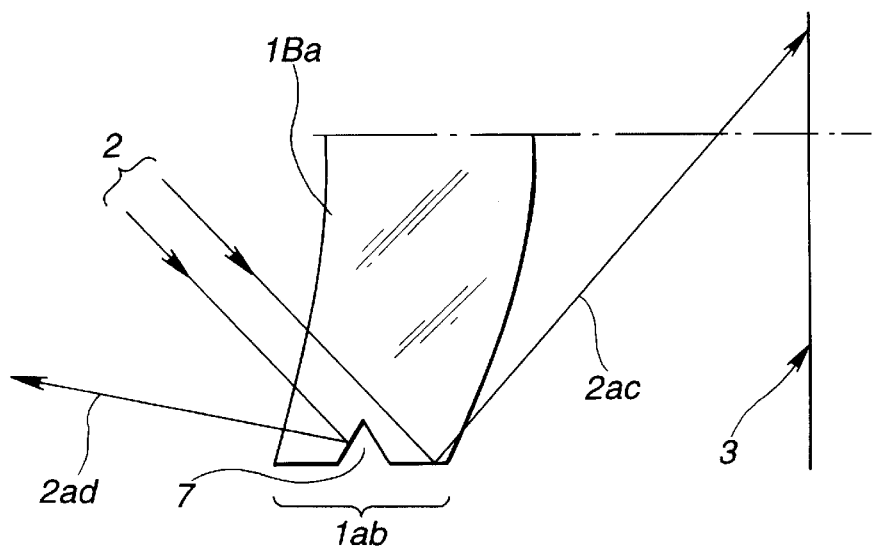
FIG. 9 is an enlarged main cross-sectional view of a principal portion showing only the lower half of the lens shown in FIG. 8, illustrating the incident rays cast into this lens, and the optical path of harmful rays which can be prevented by reflection preventing means provided in this lens.
Figure 10:
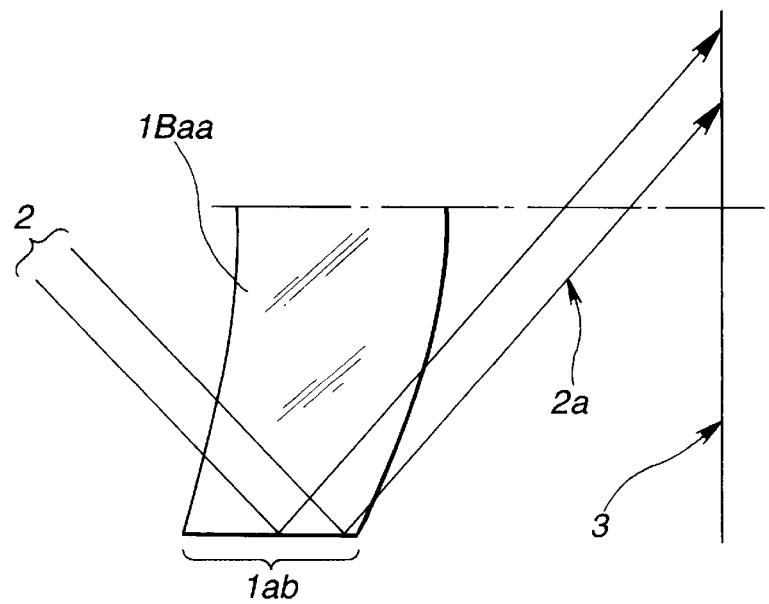
FIG. 10 is a reference diagram illustrating the optical path of harmful rays which are capable of occurring in the event that a reflection-preventing portion is not provided in a lens of the same form as that shown in FIG. 8.

In other words, as shown in FIG. 9, a portion of the incident rays 2 into the lens 1B*a* have the direction thereof changed by the groove 7 at the cut plane 1*ab,* so as to follow an optical path such as the reflected light 2*ad,* for example. As a result of the direction of the reflected light 2*ad* being changed by the groove 7, the reflected rays 2*ad* are cast out in a direction opposite to that of the photographic aperture 3, and accordingly, there are no adverse effects on the photographic image.

Hence, according to the present embodiment, a groove 7 provided in the cut plane 1*ab* is used to cast a portion of the harmful rays generated by the lens 1B*a* in a direction opposite that of the photographic aperture 3, so the amount of harmful rays reaching the range of the photographic aperture 3 can be reduced. Thus, advantages similar to those of the first and second embodiments can be obtained.

Now, in the present embodiment, there are reflected rays 2*ac* of the incident rays 2 cast into the lens 1B*a* of which the reflection direction is not reversed. To eliminate this effect, providing at least one of the means discussed in the first and second embodiments, i.e., the black non-transmitting coat 6 on the cut plane 1*ab* and the roughened surfacing on the same cut plane 1*ab,* effectively suppresses the above reflected rays 2*acas* well. This further contributes to the removal of the harmful rays.

As described above, the first embodiment involves providing the black non-transmitting coat 6 on the cut plane 1*ab* of the lens 1*a* and the second embodiment involves providing the roughened surfacing on the cut plane 1*ab* of the lens 1A*a.* Also, the third embodiment involves providing the groove 7 in the cut plane 1*ab* of the lens 1B*a.*

Though these reflections-preventing means/harmful ray-suppressing means described with the above embodiments are each effective even when used individually, using these together even further suppresses the harmful rays generated by the cut plane 1*ab*.

Specific examples include an arrangement wherein the black non-transmitting coat 6 and the roughened surfacing is provided on the cut plane 1*ab,* an arrangement wherein the black non-transmitting coat 6 is provided on the cut plane 1*ab* in which the groove 7 has also been provided, an arrangement wherein the roughened surfacing is provided on the cut plane 1*ab* in which the groove 7 has also been provided, an arrangement wherein the black non-transmitting coat 6 and the roughened surfacing is provided on the cut plane 1*ab* in which the groove 7 has also been provided, and so forth.

Now, various types of the reflection-preventing means in the above third embodiment, i.e., a groove in the cut plane 1*ab,* may be envisioned. For example, FIGS. 11 through 16 show various forms which can be conceived when the angle of the sides of the groove are taken into consideration.

FIGS. 11 through 16 are enlarged main cross-sectional views of a relevant portion, e.g., the lower half of the lens 1*a,* illustrating various forms of the groove 7 constituting the reflection preventing portion provided on the cut surface 1*ab* of the lens 1*a*. Each drawing illustrates the incident rays cast into each lens 1*a,* and the optical paths of the harmful rays which can be suppressed by the reflection-preventing portions (groove 7) provided in the lenses 1*a*.

Figure 11:
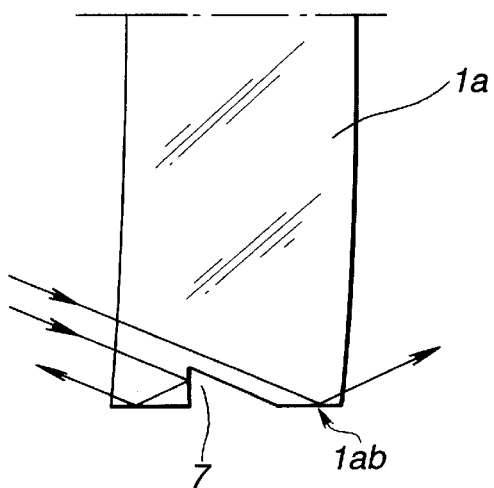
FIG. 11 is an enlarged main cross-sectional view of a principal portion showing only the lower half of the lens shown in FIG. 8, illustrating the optical path in the case that the angle of the incident rays is a low angle, in an arrangement wherein the sides of the groove in the cut plane are non-symmetrical in angle.
Figure 12:
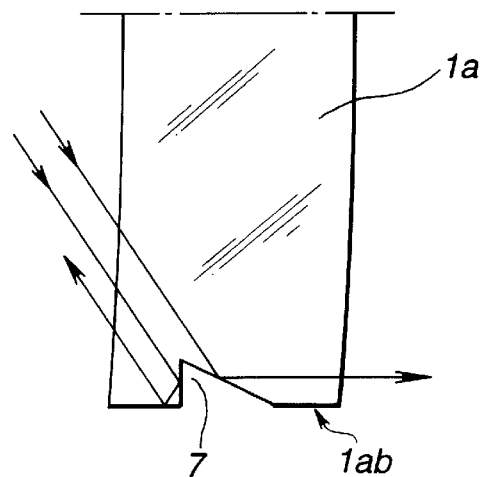
FIG. 12 is an enlarged main cross-sectional view of a principal portion showing only the lower half of the lens shown in FIG. 8, illustrating the optical path in the case that the angle of the incident rays is a high angle, in an arrangement wherein the sides of the groove in the cut plane are non-symmetrical in angle.
Figure 13:
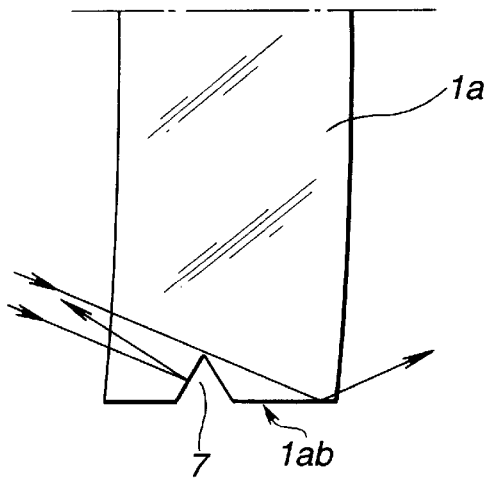
FIG. 13 is an enlarged main-cross-sectional view of a principal portion showing only the lower half of the lens shown in FIG. 8, illustrating the optical path in the case that the angle of the incident rays is a low angle, in an arrangement wherein the sides of the groove in the cut plane are symmetrical in angle.
Figure 14:
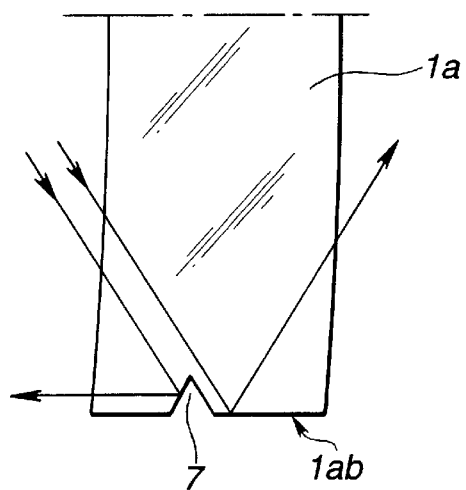
FIG. 14 is an enlarged main cross-sectional view of a principal portion showing only the lower half of the lens shown in FIG. 8, illustrating the optical path in the case that the angle of the incident rays is a high angle, in an arrangement wherein the sides of the groove in the cut plane are symmetrical in angle.

Generally classifying the forms of the grooves in the FIGS. 11 through 16, the examples shown in FIGS. 11, 12, 15, and 16 are cases wherein the angles of the sides of the groove have been formed in a non-symmetrical fashion, and the examples shown in FIGS. 13 and 14 are cases wherein the angles of the sides of the groove have been formed in a symmetrical fashion.

Figure 15:
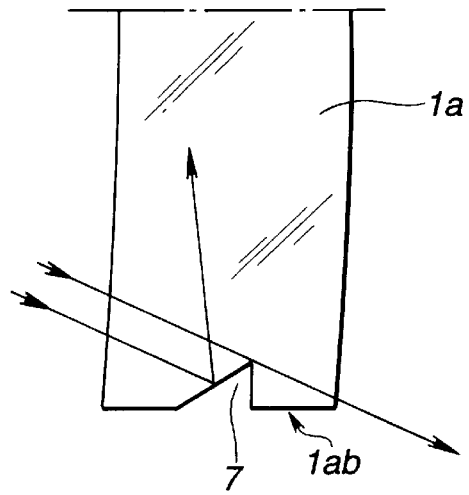
FIG. 15 is an enlarged main cross-sectional view of a principal portion showing only the lower half of the lens shown in FIG. 8, illustrating the optical path in the case that the angle of the incident rays is a low angle, in an arrangement wherein the sides of the groove in the cut plane are non-symmetrical in angle.
Figure 16:
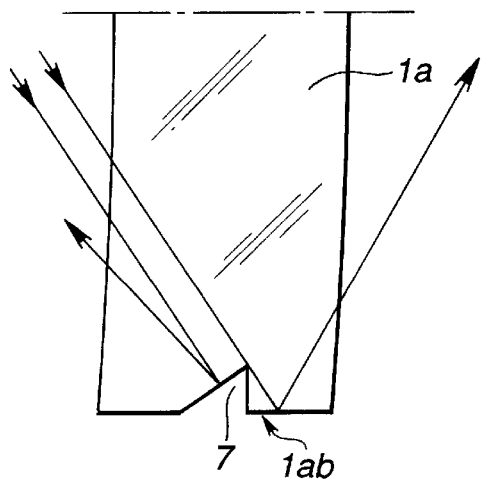
FIG. 16 is an enlarged main cross-sectional view of a principal portion showing only the lower half of the lens shown in FIG. 8, illustrating the optical path in the case that the angle of the incident rays is a high angle, in an arrangement wherein the sides of the groove in the cut plane are non-symmetrical in angle.
Figure 17:
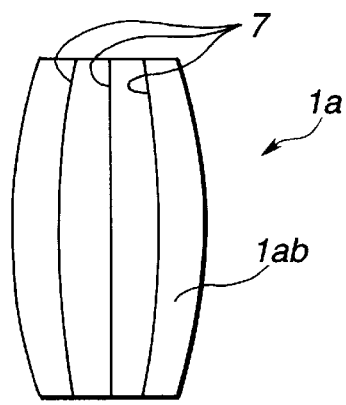
FIGS. 17 through 22 are enlarged plan views of the lens shown in FIG. 8 from a direction generally orthogonal to the optical axis, in which a plurality of grooves have been provided in the cut plane in a generally uniform manner.
Figure 18:
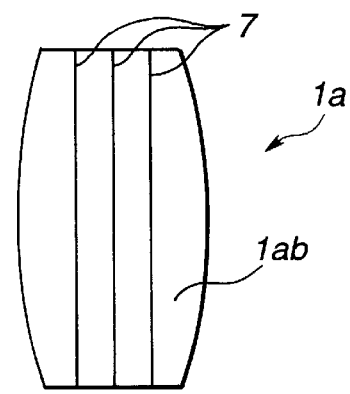
Figure 19:
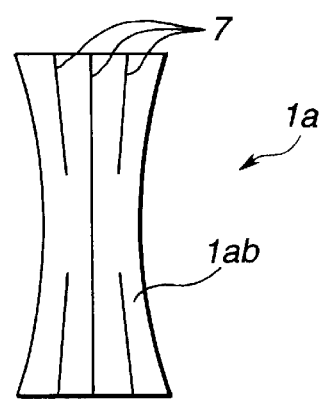
Figure 20:
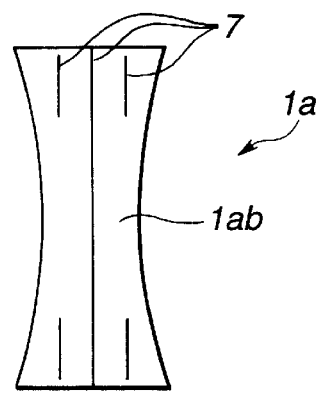
Figure 21:
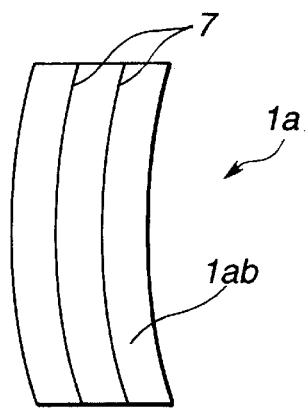
Figure 22:
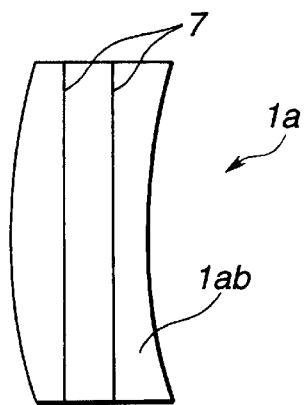
Figure 23:
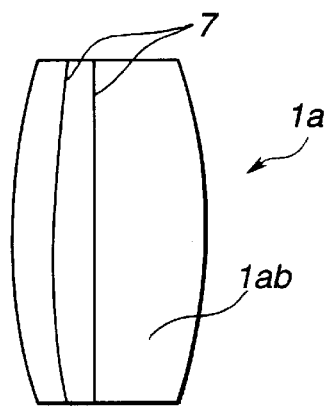
FIGS. 23 through 28 are enlarged plan views of the lens shown in FIG. 8 from a direction generally orthogonal to the optical axis, in which a plurality of grooves have been provided in the cut plane in a non-uniform manner.
Figure 24:
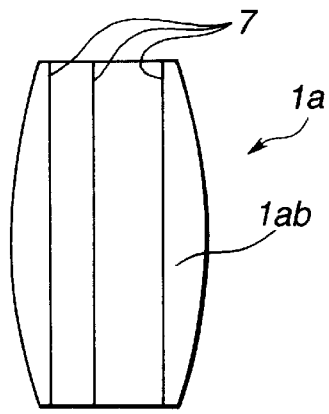
Figure 25:
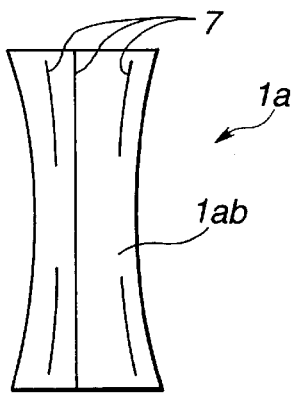
Figure 26:
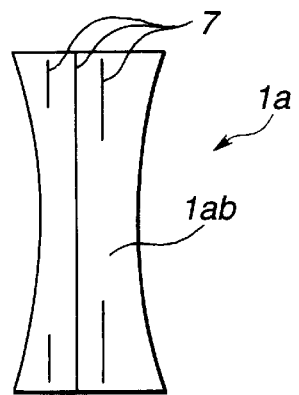
Figure 27:
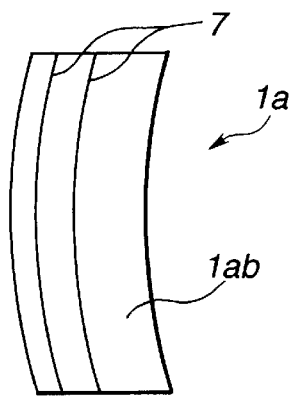
Figure 28:
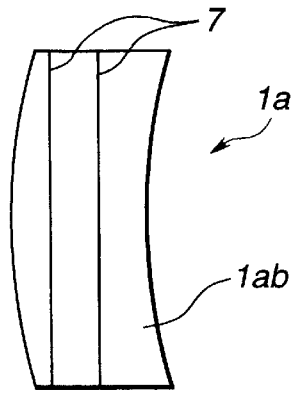

Regarding the angle of the incident rays cast into the lenses 1*a* provided with these grooves, FIGS. 11, 13, and 15 illustrate incident rays at low angles, and FIGS. 12, 14, and 16 illustrate incident rays at high angles.

Here, the term "low angle" indicates that the angle of the incident rays to the surface of the cut plane 1*ab* of the lens 1*a* is an acute angle, and the term "high angle" indicates that the angle of the incident rays to the surface of the cut plane 1*ab* of the lens 1*a* is an obtuse angle.

As shown in FIGS. 11 through 16, a portion of incident rays cast into the lens 1*a* are cast out in a direction opposite to that of the photographic aperture 3, so the groove 7 of the various forms serves to suppress the harmful rays in an even more effective manner.

Also, though the remainder of the incident rays reflect toward the photographic aperture and thus become harmful rays, these remaining harmful rays also can be suppressed by performing the surface processing or the like according to the above-described first and second embodiments to the cut plane 1ab.

Now, in order to prevent the harmful rays which cannot be removed by the above third embodiment, or the groove 7 (reflection-preventing portion) shown in FIGS. 11 through 16, from having adverse effects on the photographic image, the angle of the groove 7 must be set so that the harmful rays capable of reaching the photographic aperture are minimized, by taking various items in consideration, such as the focal distance of the lens, the number of lenses making up the overall photographic lens system, and so forth.

On the other hand, FIGS. 17 through 28 show various forms which can be conceived when the position of the grooves 7 provided to the cut plane 1ab is taken into consideration.

FIGS. 17 through 28 are enlarged plan views of the lens 1a from a direction generally orthogonal to the optical axis, wherein multiple grooves 7 are provided as reflection-preventing members on the cut plane 1ab of the lens 1a.

Categorizing the various forms of the lens 1 a further, FIGS. 17 through 22 are arrangements wherein multiple grooves 7 have been provided on the cut surface 1ab in a generally uniform manner, and FIGS. 23 through 28 are arrangements wherein multiple grooves 7 have been provided on the cut surface 1ab in a non-uniform manner.

As shown in the Figures, the grooves serving as the reflection-preventing portion may be positioned on the cut plane 1ab so as to follow the lens plane of the lens 1a (see FIGS. 17, 21, 23, 25, 27), or intermittent grooves may be provided instead of continuous grooves (see FIGS. 19, 20, 25, 26). Incidentally, there is a need for at least one of the grooves 7 to cover the entire width in the direction orthogonal to the optical axis.

Further, FIGS. 29 through 32 show various forms which can be conceived when the depth of the grooves provided in the cut plane 1a is taken into consideration.

FIGS. 29 through 32 are enlarged main cross-sectional views of a relevant portion showing only the upper half of the lens 1a, wherein multiple grooves 7 have been formed in the cut plane 1ab of the lens 1a to serve as a reflection-preventing portion.

Figure 29:
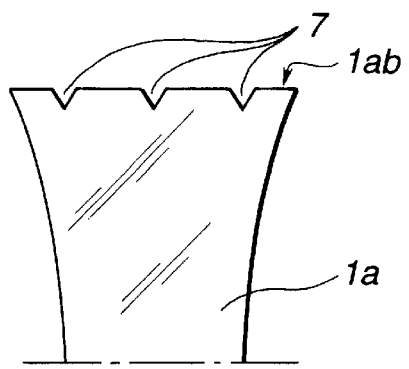
FIGS. 29 and 30 are enlarged main cross-sectional views of a principal portion showing only the upper half of the lens shown in FIG. 8, illustrating an arrangement wherein the grooves formed in the cut plane have all been formed to a uniform depth.
Figure 30:
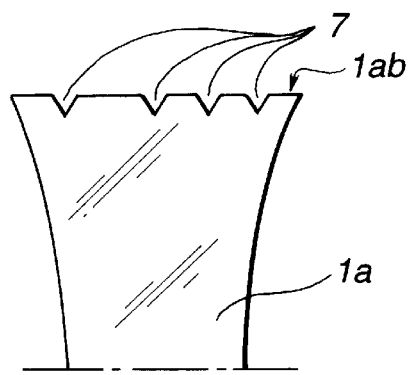
Figure 31:
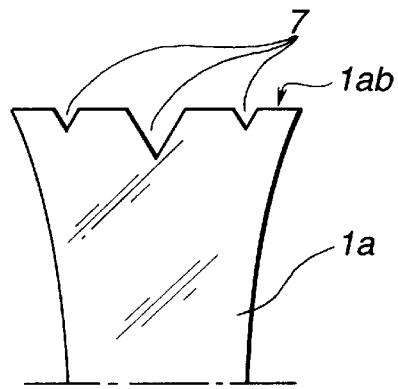
FIGS. 31 and 32 are enlarged main cross-sectional views of a principal portion showing only the upper half of the lens shown in FIG. 8, illustrating an arrangement wherein the grooves formed in the cut plane have been formed to non-uniform depths.
Figure 32:
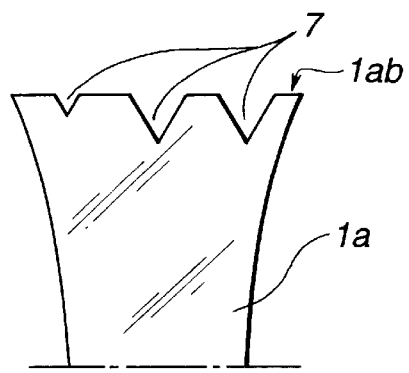

Now, as shown in FIGS. 29 and 30, there are arrangements wherein the multiple grooves have all been formed to a uniform depth, and, as shown in FIGS. 31 and 32, arrangements wherein the multiple grooves have been formed to different depths, and so forth.

With the grooves 7 of the various forms shown in FIGS. 25 through 32 serving as examples, the position and depth of the grooves 7 must be set so that the harmful rays capable of reaching the photographic aperture are minimized. In forming the lenses in this manner, various factors are taken into consideration, such as the focal distance of the lens, the number of lenses making up the overall photographic lens system, and so forth.

Incidentally, the grooves 7 formed in the lens 1a can be easily formed by general means, such as grinding the lens 1a with a grindstone, glass lens forming methods, plastic forming methods, and so forth.

It is clear that a wide variety of different embodiments can be configured based on the present disclosure, without departing from the spirit or scope of the present invention.

The present invention is by no means restricted in any way by any particular embodiments thereof, except as restricted in the attached claims.

What is claimed is:

1. An optical system comprising:
   a lens formed in a generally rectangular shape and having a plurality of grooves for preventing reflection of harmful rays, each groove being formed on at least one edge plane at the perimeter of the lens and extending in a direction generally orthogonal to rays passing through the lens, said plurality of grooves having different depths respectively; and
   a photographic aperture positioned behind the lens.

2. The optical system according to claim 1, wherein each groove is shaped such that harmful rays entering the lens which are capable of reaching the photographic aperture are minimized.

3. The optical system according to claim 1, wherein each groove has a surface which is angled relative to the edge plane on which said groove is formed, such that harmful rays entering the lens and capable of reaching the photographic aperture are minimized.

4. The optical system according to claim 1, wherein each groove has a depth such that harmful rays entering the lens which are capable of reaching the photographic aperture are minimized.

5. The optical system according to claim 1, further comprising a black non-transmitting coating on the edge plane at the perimeter of the lens.

6. The optical system according to claim 1, further comprising roughened surfacing on the edge plane at the perimeter of the lens.

7. The optical system according to claim 6, further comprising a black non-transmitting coating on the edge plane at the perimeter of the lens.

8. The optical system according to claim 1, further comprising a plurality of second grooves, for preventing reflection of harmful rays, formed on the at least one edge plane at the perimeter of the lens, the second grooves extending in the direction generally orthogonal to rays passing through the lens.

9. An optical system comprising:
   a lens formed in a generally rectangular shape and having a roughened surfacing for preventing reflection of harmful rays, said roughened surfacing being provided on at least one edge plane at the perimeter of the lens; and
   a photographic aperture positioned behind the lens.

10. The optical system of claim 9, further comprising a black coating on the edge plane at the perimeter of the lens.

11. A photographic optical system comprising:
    a photographic screen formed by a photographic aperture; and
    a lens in which at least a portion of the perimeter of said lens has been removed except for an effective area of the lens corresponding to the photographic screen, the removed portion forming an edge on the lens, said edge having a roughened surfacing for preventing reflection of rays from the edge of the lens formed by the removed portion.

12. The photographic optical system of claim 11, further comprising a black coating on the edge plane at the perimeter of the lens.

13. A photographing optical system, comprising:
    at least one lens of which the outer configuration is circular, a portion of which has been removed in accordance with a photographing screen defined by a photographing aperture; and
    harmful rays preventing means for preventing reflection of harmful rays formed at the edge planes of said lens from entering said photographing aperture;

wherein said harmful rays preventing means is formed only at the location of said lens from which the removed portion has been removed.

14. A photographing optical system according to claim 13, wherein said harmful rays preventing means is formed of a plurality of grooves which extend in a direction generally orthogonal to the optical axis of said lens.

15. A photographing optical system according to claim 14, wherein said plurality of grooves includes a first groove which has a first depth and a second groove which has a second depth.

16. A photographing optical to claim 14, wherein the surfaces of said grooves have been subjected to sanded surfacing.

17. A photographing optical system according to claim 16, wherein the surfaces of said grooves have been subjected to black non-transmitting coating.

18. A photographing optical system according to claim 15, wherein the surfaces of said grooves have been subjected to black non-transmitting coating.

19. A photographing optical system according to claim 14, wherein each of said plurality of grooves has two surfaces to form a substantially V-shape in cross-section, one of the two surfaces being provided to be generally orthogonal to the optical axis of said lens.

* * * * *